US00RE42666E

(19) United States
(12) Reissued Patent
Saotome

(10) Patent Number: US RE42,666 E
(45) Date of Reissued Patent: Sep. 6, 2011

(54) TABLE

(75) Inventor: Hiroshi Saotome, Ryugasaki (JP)

(73) Assignee: Okamura Corporation (JP)

() Term: 14 Years**

(21) Appl. No.: 29/365,400

(22) Filed: Jul. 8, 2010

Related U.S. Patent Documents

Reissue of:
(64) Patent No.: Des. 588,842
Issued: Mar. 24, 2009
Appl. No.: 29/279,079
Filed: Apr. 19, 2007

(30) Foreign Application Priority Data

Nov. 10, 2006 (JP) ..... 2006-030800

(51) LOC (9) Cl. ..... 06-03
(52) U.S. Cl. ..... D6/480
(58) Field of Classification Search ..... D6/480–489, D6/495–499, 429–431; 108/150, 153.1, 108/156, 157.1, 161, 115, 124; 248/188, 248/188.1, 188.8
See application file for complete search history.

(56) References Cited

U.S. PATENT DOCUMENTS

D164,295 S * 8/1951 Gierlrich ..... D6/429
D236,058 S * 7/1975 Kramer ..... D6/484
D322,729 S * 12/1991 Diffrient ..... D6/487
5,121,697 A * 6/1992 Baum et al. ..... 108/124
D330,299 S * 10/1992 Saotome ..... D6/429
D336,393 S * 6/1993 Saotome ..... D6/484
D380,632 S * 7/1997 Schacht ..... D6/495
D412,256 S * 7/1999 Gutgsell ..... D6/495
D512,587 S * 12/2005 Frenkler et al. ..... D6/480
D552,883 S * 10/2007 Saotome ..... D6/480
D554,909 S * 11/2007 Theemann ..... D6/480

* cited by examiner

*Primary Examiner* — Janice Seeger
(74) *Attorney, Agent, or Firm* — Ostrolenk Faber LLP

(57) CLAIM

The ornamental design for a table, as shown and described.

DESCRIPTION

FIG. 1 is a front elevational view of a table showing my new design;
FIG. 2 is a right side elevational view thereof, the opposite side view being a mirror image;
FIG. 3 is a top plan view thereof;
FIG. 4 is a rear elevational view thereof;
FIG. 5 is a bottom plan view thereof;
FIG. 6 is a cross-sectional view taken along the lines 6-6 in FIG. 1;
FIG. 7 is a perspective view of the table; and,
FIG. 8 is an enlarged perspective view of a fragment of the table as shown in FIG. 7.
The broken lines are for environmental purposes only and form no part of the claimed design.

1 Claim, 8 Drawing Sheets

Figure 1:
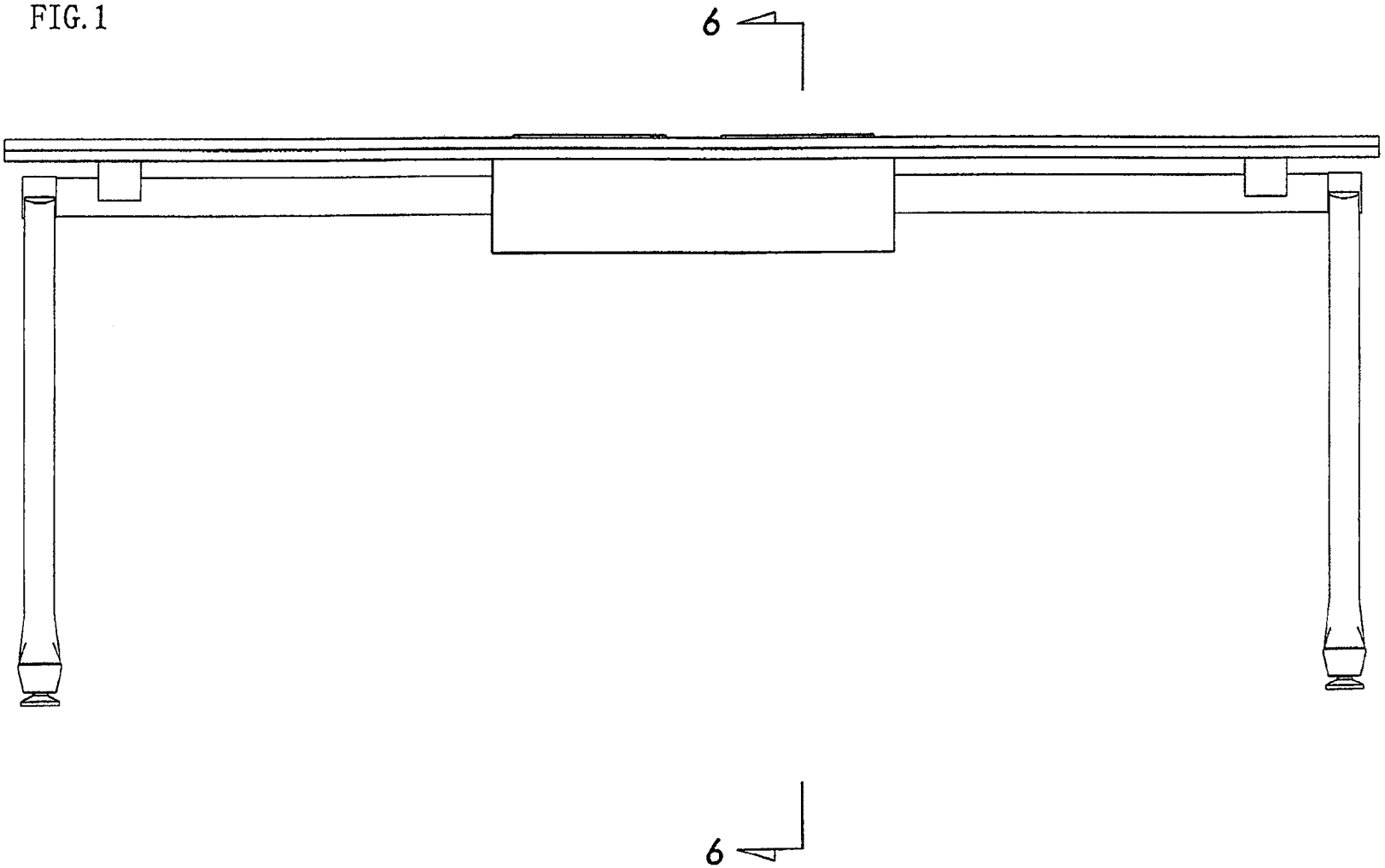
Figure 2:
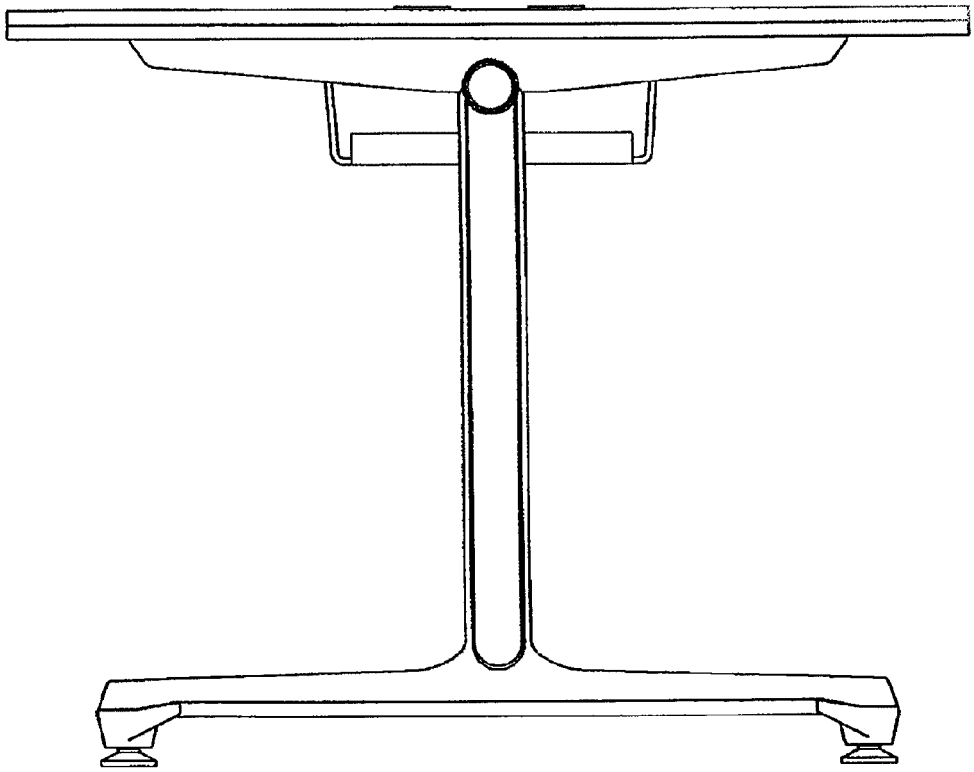
Figure 3:
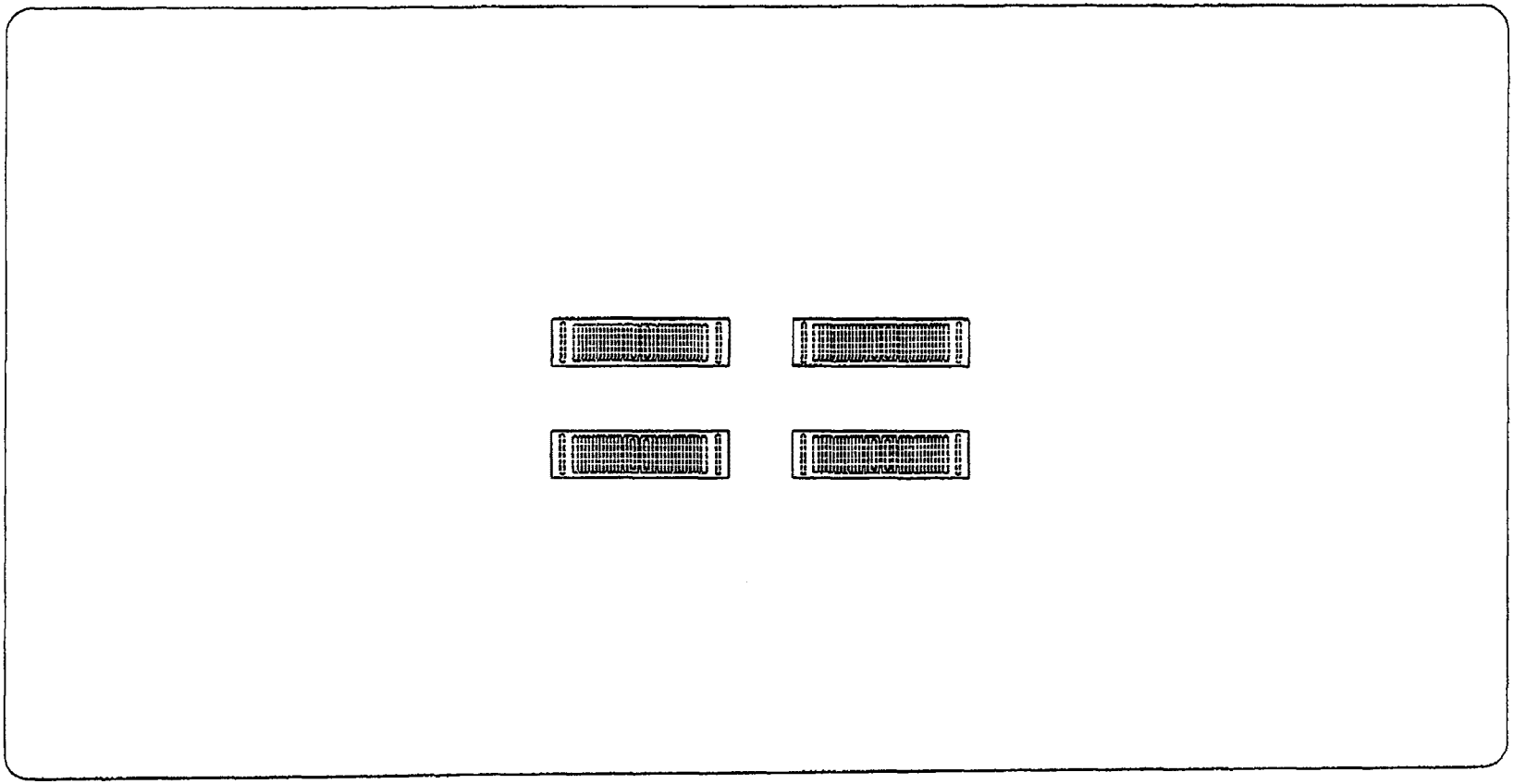
Figure 4:
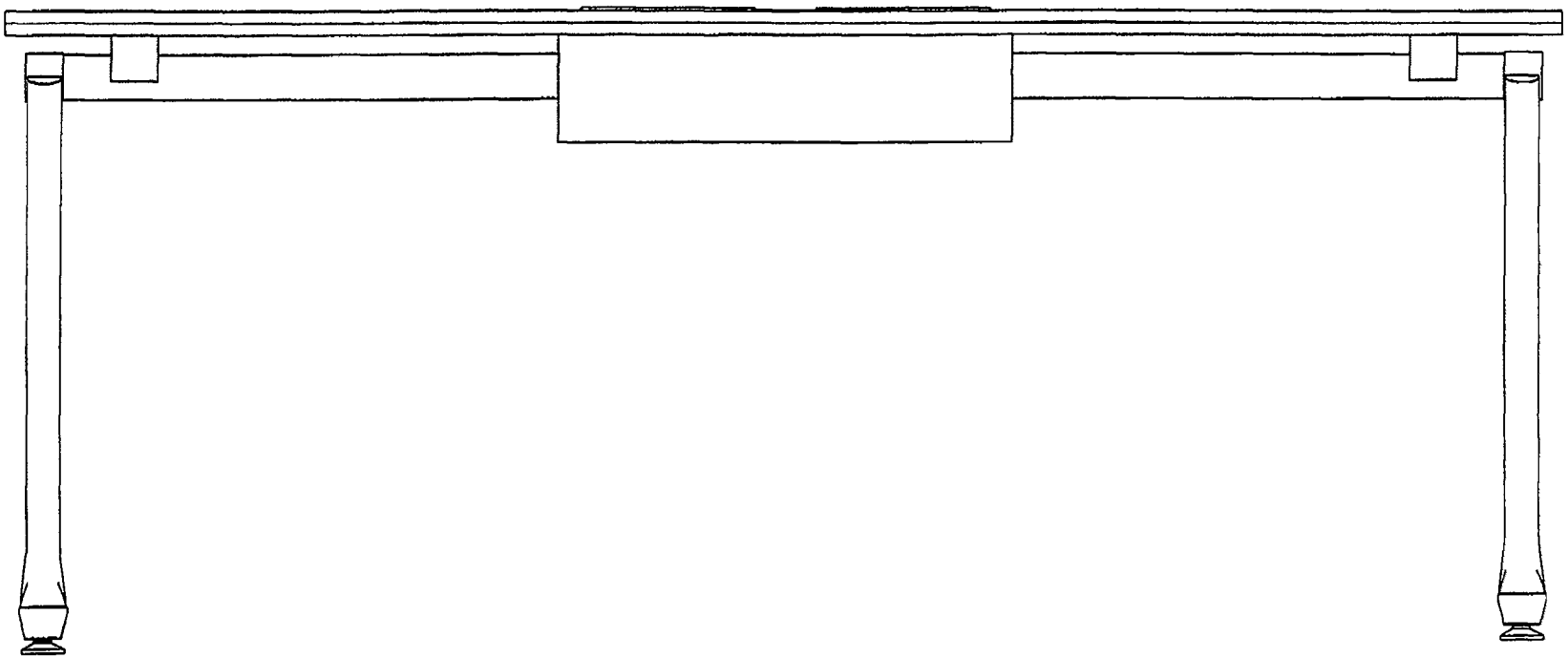
Figure 5:
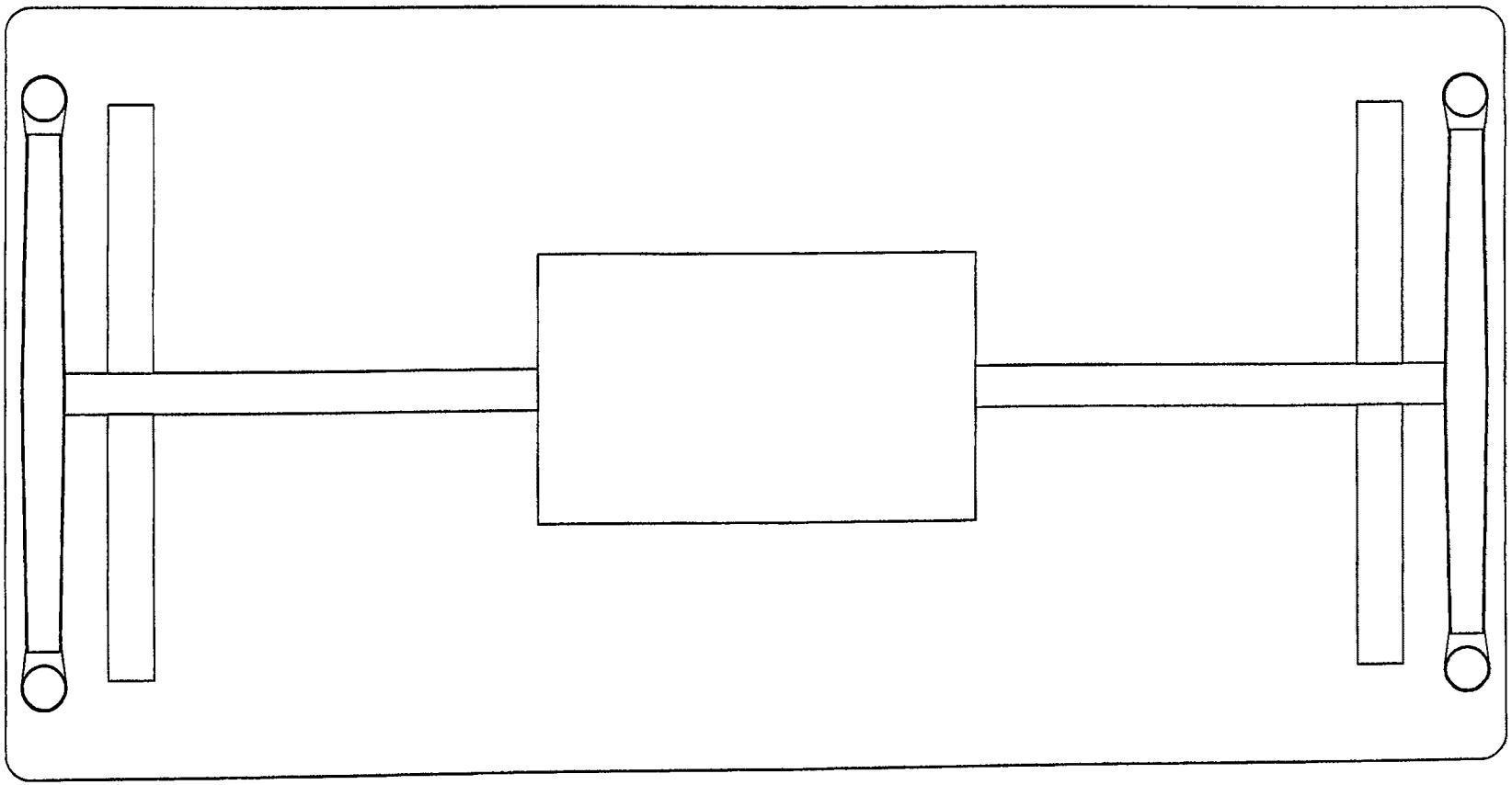
Figure 6:
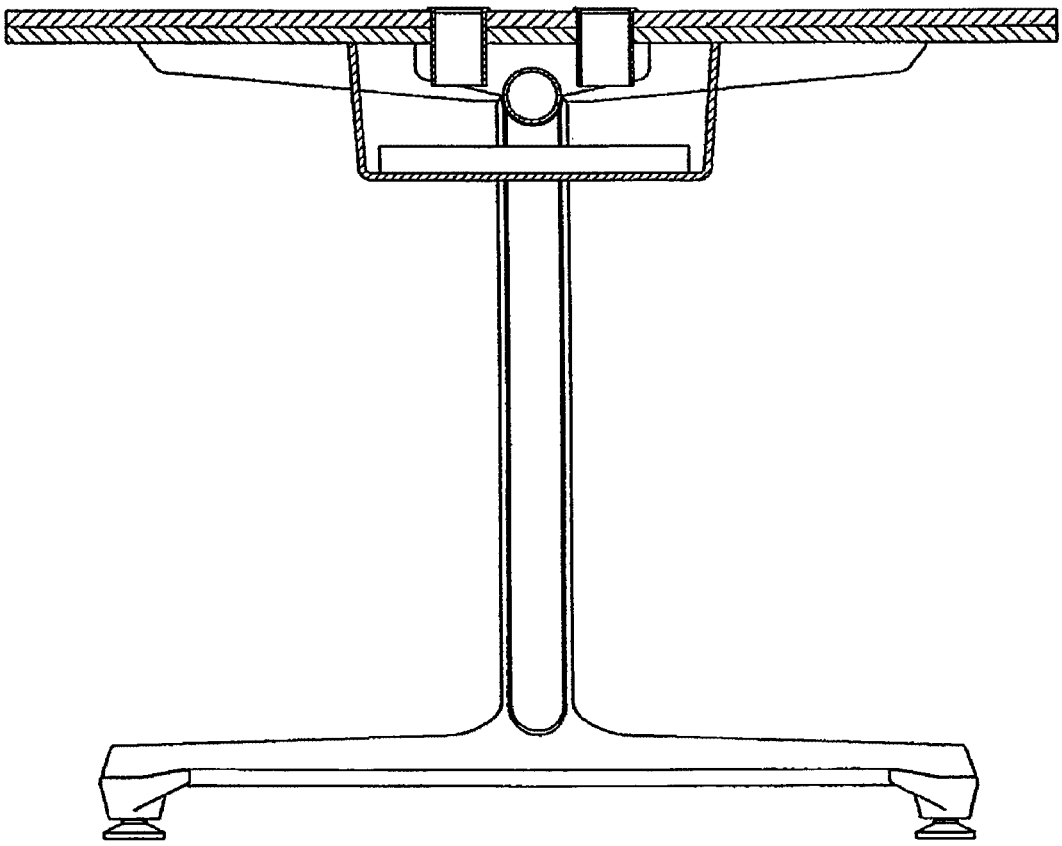
Figure 8:
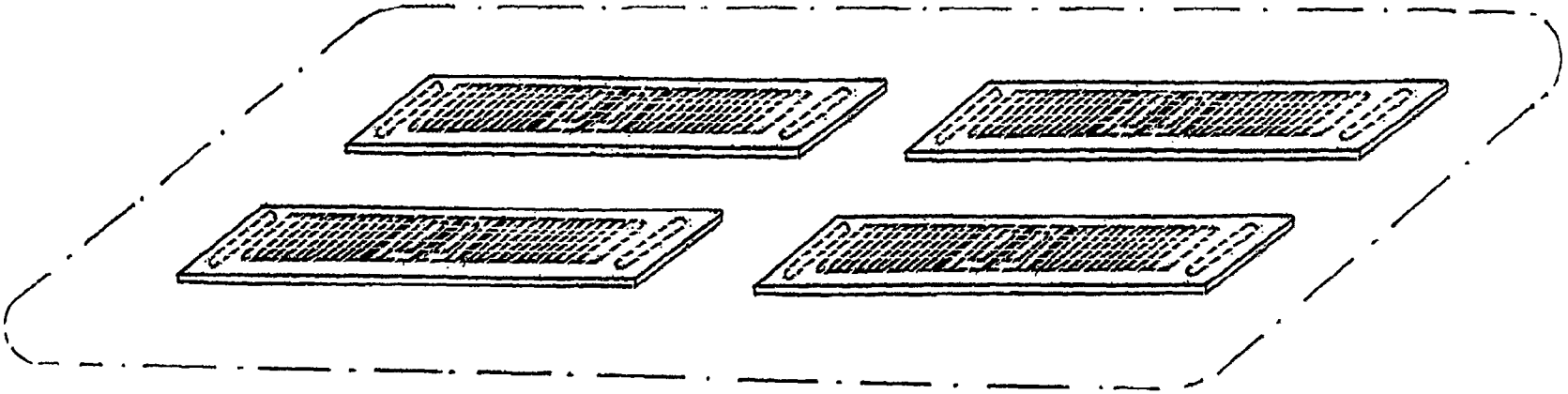

Matter enclosed in heavy brackets [ ] appears in the original patent, but forms no part of this reissue; matter printed in italics indicates the additions made by reissue.

(Amended)

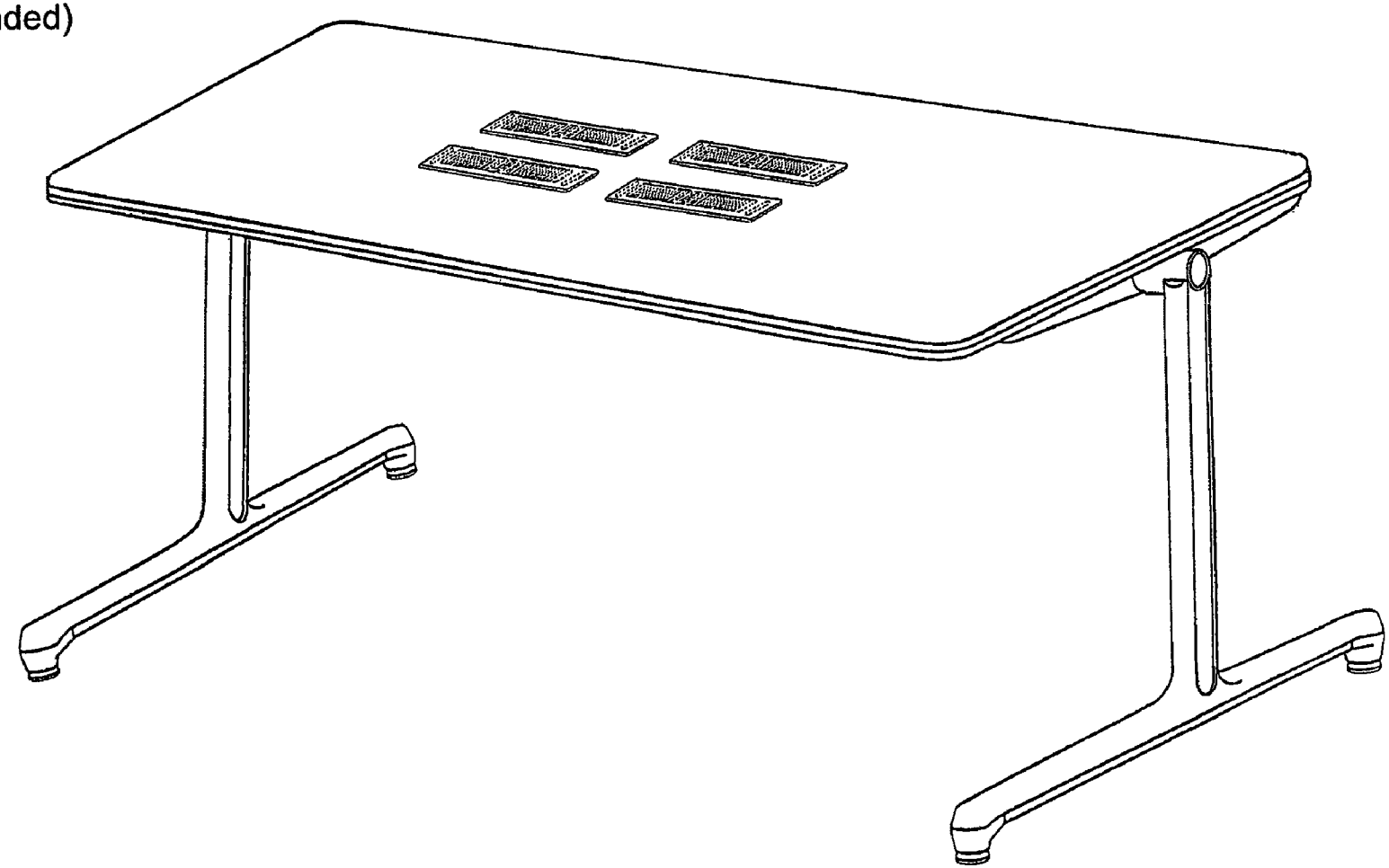
FIG. 7
(Amended)